United States Patent
Diggins

(10) Patent No.: US 10,154,230 B2
(45) Date of Patent: Dec. 11, 2018

(54) GENERATING AN OUTPUT FRAME FOR INCLUSION IN A VIDEO SEQUENCE

(71) Applicant: Imagination Technologies Limited, Kings Langley (GB)

(72) Inventor: Jonathan Diggins, Waterlooville (GB)

(73) Assignee: Imagination Technologies Limited, Kings Langley (GB)

(*) Notice: Subject to any disclaimer, the term of this patent is extended or adjusted under 35 U.S.C. 154(b) by 165 days.

(21) Appl. No.: 14/479,069

(22) Filed: Sep. 5, 2014

(65) Prior Publication Data
US 2015/0078449 A1 Mar. 19, 2015

(30) Foreign Application Priority Data

Sep. 18, 2013 (GB) .................................. 1316595.6

(51) Int. Cl.
| | | |
|---|---|---|
| *H04N 7/12* | (2006.01) | |
| *H04N 7/01* | (2006.01) | |
| *H04N 19/80* | (2014.01) | |
| *H04N 19/587* | (2014.01) | |
| *H04N 19/86* | (2014.01) | |
| *H04N 19/196* | (2014.01) | |
| *H04N 19/513* | (2014.01) | |

(52) U.S. Cl.
CPC ......... *H04N 7/0127* (2013.01); *H04N 19/198* (2014.11); *H04N 19/521* (2014.11); *H04N 19/587* (2014.11); *H04N 19/80* (2014.11); *H04N 19/86* (2014.11)

(58) Field of Classification Search
CPC .. H04N 19/198; H04N 19/521; H04N 19/587; H04N 19/80; H04N 19/86; H04N 7/0127

USPC ....................................................... 375/240.16
See application file for complete search history.

(56) References Cited

U.S. PATENT DOCUMENTS

| | | | | |
|---|---|---|---|---|
| 8,164,636 | B1* | 4/2012 | Linzer | H04N 5/23254 348/208.12 |
| 2002/0105526 | A1* | 8/2002 | Gonsalves | G06T 5/20 345/589 |
| 2010/0284458 | A1* | 11/2010 | Andersson | H04N 19/176 375/240.03 |
| 2011/0211128 | A1* | 9/2011 | Petrides | H04N 5/144 348/699 |

FOREIGN PATENT DOCUMENTS

EP 2244485 A2 10/2010

* cited by examiner

*Primary Examiner* — Jessica M Prince
(74) *Attorney, Agent, or Firm* — Vorys, Sater, Seymour and Pease LLP; Vincent M DeLuca

(57) ABSTRACT

In frame rate conversion, output frames (e.g. interpolated frames) are generated for inclusion in a video sequence. A first motion-compensated image may be generated for representing an output frame, e.g. by using motion estimation based on one or more of the existing frames of the video sequence. At least part of the first motion-compensated image is smoothed to determine a smoothed motion-compensated image. Trust indications can be determined for the pixels of the first motion-compensated image to indicate levels of trust in the pixel values. The trust indications may be used to determine how to selectively combine the pixels of the first motion-compensated image and the pixels of the smoothed motion-compensated image to thereby generate the output frame.

20 Claims, 10 Drawing Sheets

GENERATING AN OUTPUT FRAME FOR INCLUSION IN A VIDEO SEQUENCE

BACKGROUND

A video sequence comprises a plurality of frames which are to be played out sequentially. The frame rate of a video sequence indicates the rate at which the frames are to be played out in order to correctly play the video sequence. For example, a video sequence may be a film having a frame rate of 24 frames per second. As another example, a video sequence may have a frame rate of 50 or 60 frames per second (e.g. for television broadcast). Other video sequences may have other frame rates. Each frame of the video sequence comprises a plurality of pixels which form an image. For example, a frame of a High Definition video sequence may be an image formed by an array of pixel values at each of 1920×1080 possible pixel locations.

In other examples pixel values may exist at some, but not all, of the possible pixel locations in any one frame. For example, in an interlaced system, pixel values may exist for alternate rows of the possible pixel locations, such that a partial image is formed. These partial images may be known as "fields", and two fields, often sampled at different times, comprise a complete frame. In these other examples, multiple partial images (or "fields") may be used to determine complete images (or "frames"), e.g. by a process called de-interlacing.

For clarity, the following description describes systems operating on complete frames. All of the methods described may equally be applied to video sequences comprising fields or complete frames, and the use of the term "frame" should be understood to refer to either complete frames or fields as appropriate.

A frame rate converter may be used to alter the frame rate of a video sequence. A process of frame rate conversion applied by a frame rate converter may include adding frames into the video sequence and/or removing frames from the video sequence. In a simple example, a frame rate converter may double the frame rate of a video sequence (e.g. from 24 frames per second to 48 frames per second) by inserting a frame between each pair of existing frames in the video sequence. In one example, each of the frames which are inserted into the video sequence may simply be a copy of one of the existing frames, e.g. such that each frame of the existing video sequence is played out twice in a row, but at twice the speed of the original video sequence. In this example, the perceptual smoothness of the video sequence might not be significantly improved by doubling the frame rate, but this frame rate conversion does allow the video sequence, which originally has one frame rate, to be outputted at a different frame rate (e.g. when a film is broadcast on a television signal).

More complex frame rate converters attempt to determine what a frame would look like at a point in time between two of the existing frames to thereby generate a new frame for inclusion in the video sequence between the two existing frames. For example, motion estimation may be used to track the way that parts of an image move between one frame and the next. A common motion estimator is the block-based type, in which a frame of a video sequence is divided into a number of blocks, and for each block a vector (referred to as a "motion vector") is found that represents the motion of the pixels in that block. In one example, the determination of the motion vector for a block of a current frame involves searching the previous frame in the video sequence to find the area of image data of the previous frame with contents that are most similar to the contents of the block of the current frame. Other factors may also be involved in the determination of the motion vector for a block. The motion vectors can be used to produce an interpolated frame at an intermediate position (given by a temporal phase, $\phi$) between two existing frames in a video sequence. For example, if the interpolated frame is to be included at the mid-point between two adjacent existing frames (i.e. if the temporal phase, $\phi$, of the interpolated frame is 0.5) then the motion vectors determined between the two existing frames may be halved (i.e. multiplied by the temporal phase, $\phi$) and then used to determine how the image in one of the existing frames should be changed for use in representing the interpolated frame.

Problems can occur when an interpolated frame is predicted using motion vectors. In particular, it is often difficult to determine accurate motion vectors for occluded and/or revealed areas of the interpolated frame. Occluded and revealed areas occur where different objects have different magnitudes and/or directions of motion between two successive frames of a video sequence. Inaccurate motion vectors may then result in visible artefacts as pixel data is interpolated into incorrect locations in the interpolated frame. The distribution of these artefacts around the edges of moving objects, or near where there is a change in the motion, has a distinctive appearance that is often referred to as a "halo". A halo may take many different forms depending upon the exact process used to predict the interpolated frame. For example, the halo may include sharp "rip and tear" artefacts with sharp edges which can give the appearance of blockiness in the rendered image. Perceptually, the distortion to the video sequence may be cumulative, such that if many of the interpolated frames of the video sequence (e.g. there may be one, two, three or more interpolated frames for every one of the existing original frames of the video sequence) include halo artefacts then the video sequence may appear to have more distortion than the apparent distortion of each of the interpolated frames when viewed separately. The halo artefacts may appear to move as the video sequence is played out, and the apparent movement of the halo artefacts may draw a viewer's attention to the distortion caused by the halo artefacts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In frame rate conversion, output frames (e.g. interpolated frames) are generated for inclusion in a video sequence. A first motion-compensated image may be generated for representing an output frame, e.g. by using motion estimation based on one or more of the existing frames of the video sequence. At least part of the first motion-compensated image is smoothed to determine a smoothed motion-compensated image. Trust indications can be determined for the pixels of the first motion-compensated image to indicate levels of trust in the pixel values. The trust indications may be used to determine how to selectively combine the pixels of the first motion-compensated image and the pixels of the smoothed motion-compensated image to thereby generate the output frame. For example, for pixels which are trusted, the pixels of the first motion-compensated image may be used for the output frame, but for pixels which are untrusted the pixels of the smoothed motion-compensated image may be used for the output frame.

In particular, there is provided a method of generating an output frame for inclusion in a video sequence which comprises a plurality of existing frames, the method comprising: using at least one prediction based on at least one of the existing frames of the video sequence to generate a first motion-compensated image for representing the output frame; determining trust indications for pixels of the first motion-compensated image, said trust indications indicating levels of trust in the values of said pixels of the first motion-compensated image; smoothing at least part of the determined first motion-compensated image to determine a smoothed motion-compensated image; and generating the output frame by using the determined trust indications for said pixels of the first motion-compensated image to selectively combine the first motion-compensated image and the smoothed motion-compensated image.

There is also provided a frame generator configured to generate an output frame for inclusion in a video sequence which comprises a plurality of existing frames, the frame generator comprising: an image generator module configured to use at least one prediction based on at least one of the existing frames of the video sequence to generate a first motion-compensated image for representing the output frame; a trust indications module configured to determine trust indications for pixels of the first motion-compensated image, said trust indications indicating levels of trust in the values of said pixels of the first motion-compensated image; a smoothing module configured to smooth at least part of the determined first motion-compensated image to determine a smoothed motion-compensated image; and a combining module configured to generate the output frame by using the determined trust indications for said pixels of the first motion-compensated image to selectively combine the first motion-compensated image and the smoothed motion-compensated image.

There is also provided a computer program product configured to generate an output frame for inclusion in a video sequence which comprises a plurality of existing frames, the computer program product being embodied on a computer-readable storage medium and configured so as when executed on a processor to perform any of the methods described herein.

There is also provided a computer readable storage medium having encoded thereon computer readable program code for generating a processor configured to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
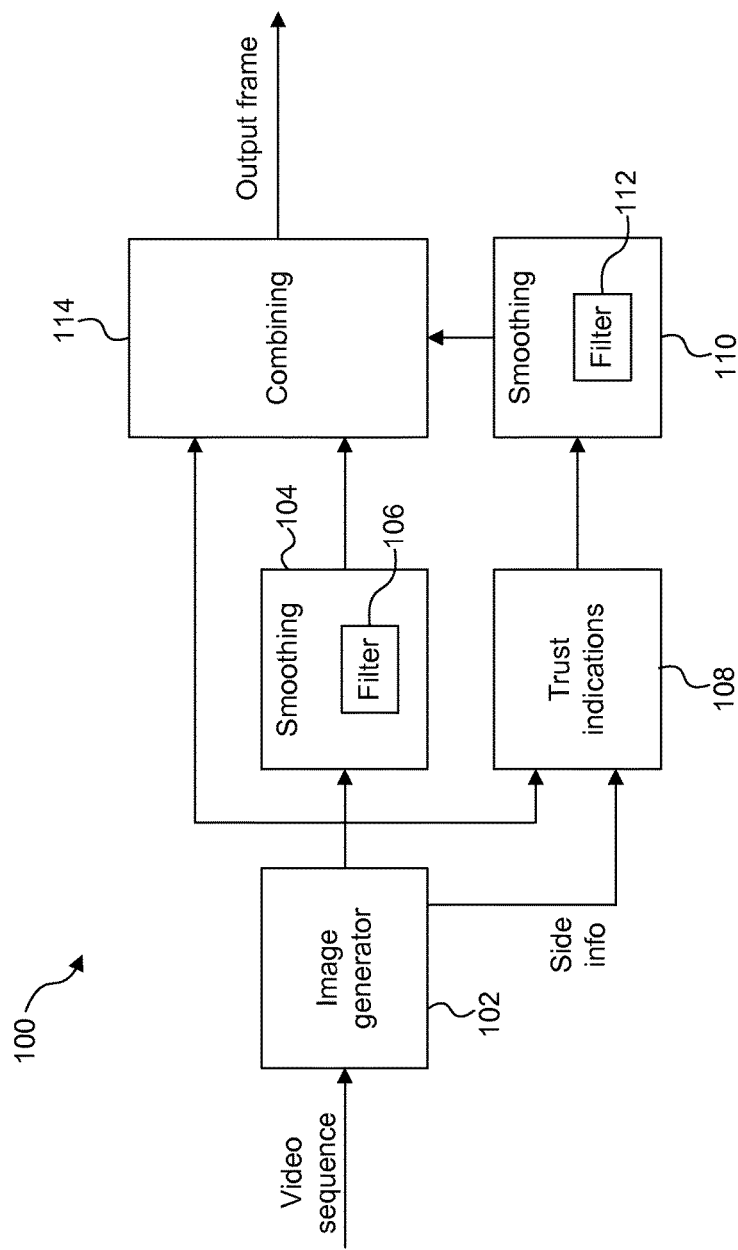
FIG. 1 shows a frame generator configured to generate an output frame for inclusion in a video sequence.

Common reference numerals are used throughout the figures, where appropriate, to indicate similar features.

DETAILED DESCRIPTION

Embodiments will now be described by way of example only.

As described above, halo artefacts may be introduced into interpolated frames that are generated by a frame rate converter using motion estimation. Halo artefacts often occur around a part of a frame which has a different motion compared to neighbouring parts of the frame, for example around an object which is moving relative to another object or relative to a background in the frame. Examples described herein relate to a frame generator and a corresponding method which can be used in frame rate conversion to generate an output frame for inclusion in a video sequence, whereby the perceptual distortion of halo artefacts in the output frame is reduced. This is achieved by determining the pixel positions at which the halo artefacts are likely to occur, based on indications of levels of trust in the values of pixels of a first motion-compensated image which is determined for representing the output frame. If the trust in a pixel value of the first motion-compensated image is high then that pixel value can be used in the output frame. However, if the trust in a pixel value of the first motion-compensated image is low then a smoothed version of the motion-compensated image can be used to determine the value of the pixel for use in the output frame. The smoothing of the motion-compensated image reduces the sharpness of edges (e.g. the "blockiness") in the halo artefacts. Therefore, by using the smoothed motion-compensated image to determine the pixel values of the output frame for pixels which are likely to have halo artefacts (that is, pixels for which the trust in the value of the first motion-compensated image is not high) the perceptual distortion caused by the blockiness of the halo artefacts in the output frame is reduced. Furthermore, for pixels which are not likely to have halo artefacts (that is, pixels for which the trust in the value of the first motion-compensated image is high) the first motion-compensated image is used to determine the pixel values of the output frame, such that detail in those pixels is not lost due to smoothing.

FIG. 1 shows a frame generator 100 configured to generate an output frame (which may also be referred to herein as an "interpolated frame") for inclusion in a video sequence. The frame generator 100 comprises an image generator module 102; a first smoothing module 104, which comprises a first smoothing filter 106; a trust indications module 108; a second smoothing module 110, which comprises a second smoothing filter 112; and a combining module 114. The image generator module 102 is arranged to receive the video sequence which comprises a plurality of existing frames. A first output of the image generator module 102 is coupled to: (i) an input of the first smoothing module 104, (ii) a first input of the trust indications module 108, and (iii) a first input of the combining module 114. A second output of the image generator is coupled to a second input of the trust indications module 108. An output of the first smoothing module 104 is coupled to a second input of the combining module 114. An output of the trust indications module 108 is coupled to an input of the second smoothing module 110. An output of the second smoothing module 110 is coupled to a third input of the combining module 114. An output of the combining module 114 is arranged to provide an output frame. Further processing may be performed on the output frame and/or the output frame may be included at an appropriate position within the video sequence. The modules of the frame generator 100 shown in FIG. 1 may be implemented in hardware or software, or a combination thereof. The frame generator 100 may be implemented within a device which comprises other components such as a memory and other processing modules which are not shown in FIG. 1.

Figure 2:
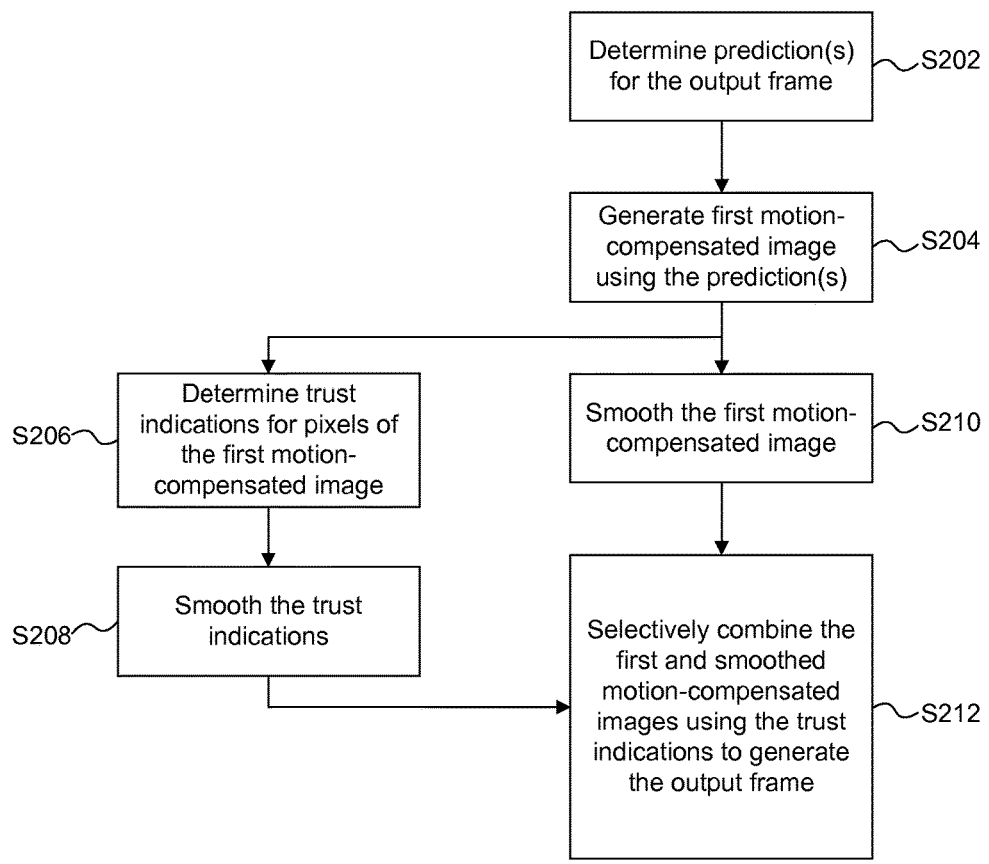
FIG. 2 shows a flowchart for a process of generating an output frame for inclusion in a video sequence.

Operation of the frame generator 100 is now described with reference to FIG. 2 which shows a flowchart for a process of generating an output frame for inclusion in a video sequence. A video sequence comprising a plurality of existing frames is received at the image generator module 102. The video sequence may for example be received from a memory or from another processing module within the device in which the frame generator 100 is implemented. The video sequence could be captured by a camera such that the frames of the video sequence are images of real-world scenes. Alternatively, some or all of the frames of the video sequence could be artificially created or altered, for example the video sequence could be an animation or the output of a video game.

In step S202 the image generator module 102 determines one or more predictions of an interpolated frame. In step S204 the image generator module 102 uses the prediction(s) to generate a first motion-compensated image for representing the interpolated frame. The generation of the first motion-compensated image may be performed in any suitable manner that involves predicting the interpolated frame based on motion vectors and areas of pixel data from one or more of the existing frames of the video sequence.

Figure 3A:
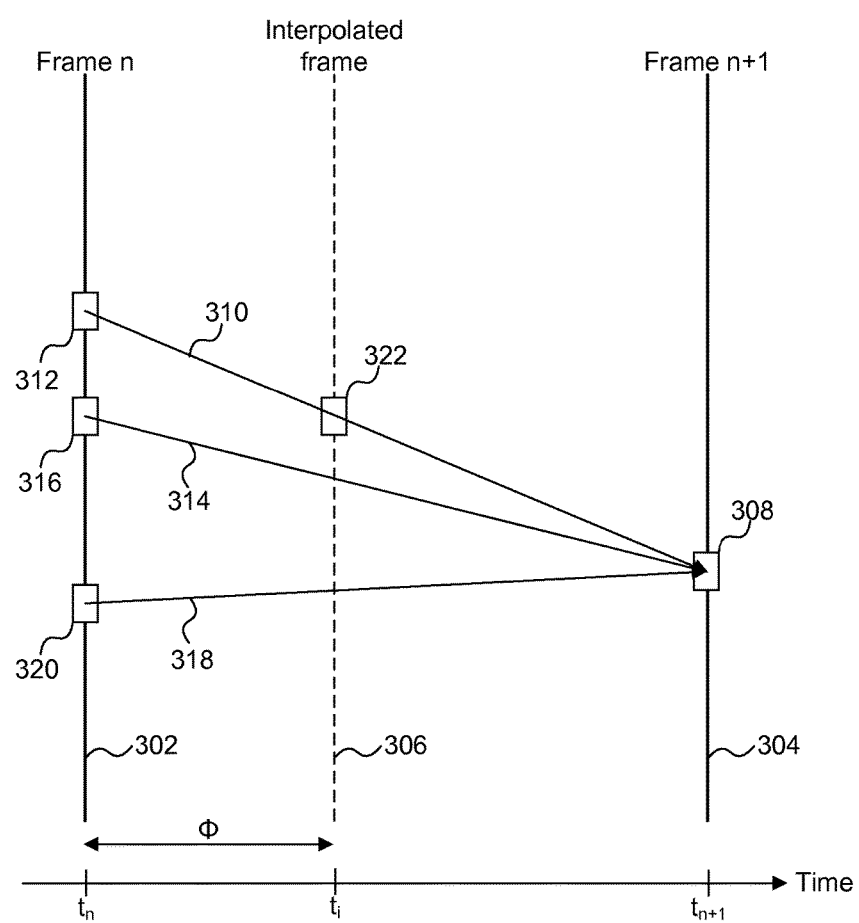
FIG. 3a shows a first example of motion vectors which may be calculated for an interpolated frame.

The pixel data of an interpolated frame may be determined using motion estimation in a number of different ways. For example, as shown in FIG. 3a, a video sequence comprises two successive existing frames 302 and 304 (Frame n and Frame n+1) occurring at times $t_n$ and $t_{n+1}$, and an interpolated frame 306 is to be generated at time $t_i$ between the two existing frames 302 and 304 at an intermediate position (given by a temporal phase, $\phi$). Frame 304 is divided into an array of blocks of pixels which form a block grid, and motion estimation proceeds for each block in turn. FIG. 3a shows motion estimation for a block 308 of the frame 304, which involves searching the previous existing frame (frame 302) in the video sequence to find the area of pixel data with contents that are most similar to the contents of block 308 (i.e. to find the best match in the frame 302 for block 308). Three candidate motion vectors are shown in FIG. 3a as an example. The motion vector 310 represents motion from the pixel area 312 in the frame 302 to the block of pixels 308 in the frame 304; the motion vector 314 represents motion from the pixel area 316 in the frame 302 to the block of pixels 308 in the frame 304; and the motion vector 318 represents motion from the pixel area 320 in the frame 302 to the block of pixels 308 in the frame 304. If it is found that the best match in the frame 302 for block 308 is from pixel area 312 then the motion vector 310 is selected for block 308. The motion vectors shown in FIG. 3a may be referred to as "single-ended" motion vectors since they start at frame 302 and end at frame 304, passing through areas of pixels in the interpolated frame 306 (rather than originating in the interpolated frame 306). It can be seen that the motion vector 310 passes through an area of pixels 322 of the interpolated frame 306. Therefore, a prediction for the pixel data in the area 322 can be found using: (i) the motion vector 310, (ii) the values of the pixels in the area 312 in frame 302 and/or the values of the pixels in the block 308 in frame 304, and (iii) the temporal phase, $\phi$. In this case, the pixels in the area 312 are projected forwards in time by an amount based on the temporal phase, $\phi$, and in accordance with the motion vector 310 to find a prediction for the pixel data in area 322 in the interpolated frame 306 and/or the pixels in the block 308 are projected backwards in time by an amount based on the temporal phase, $\phi$, and in accordance with the motion vector 310 to find a prediction for the pixel data in area 322 in the interpolated frame 306. In some examples, the final prediction for the pixel data in the area 322 of interpolated frame 306 may be a blend between the pixel data projected from frame 302 and the pixel data projected from frame 304. Predictions based on forward motion vectors between frames 302 and 304, such as motion vector 310 are called "forward" predictions for the area 322 of the interpolated frame 306. The temporal phase, $\phi$, usually has a value in the range $0<\Phi<1$, and is given by $$\Phi = \frac{t_i - t_n}{t_{n+1} - t_n}.$$

It is noted that in this example the pixel areas 312, 316, 320 and 322 are the same size as the block of pixels 308, but they are not necessarily aligned to the block grid.

Another prediction for the area 322 of the interpolated frame 306 may be determined using a backwards motion vector between the frames 304 and 302. A prediction based on a backwards motion vector is called a "backward" prediction for the area 322 of the interpolated frame 306. Backwards motion vectors are determined in a similar manner to the forwards motion vector 310 described above, except that for each pixel block of the frame 302 a search is performed in frame 304 for a pixel area that matches the block. In this case, the blocks in the frame 302 are aligned to a block grid whereas the areas in the frame 304 are not necessarily aligned to the block grid. Once a backwards motion vector has been determined between frames 304 and 302, it can be used to predict pixel data for the area 322 of the interpolated frame 306 based on the temporal phase, $\phi$, in much the same way as described above for forwards motion vectors.

Other predictions for pixel data in the area 322 of the interpolated frame 306 may be determined based on other motion vectors, e.g. by considering other frames of the video sequence which are not shown in FIG. 3a for clarity.

One issue with using single-ended motion vectors to predict the pixels of the interpolated frame 306 is that it is possible that some of the pixel positions of the interpolated frame 306 do not lie in an area into which pixel data is projected by one of the single-ended motion vectors. For example, this may be the case when the single-ended motion vectors converge or diverge for neighbouring blocks of pixels, as described in more detail below.

Figure 3B:
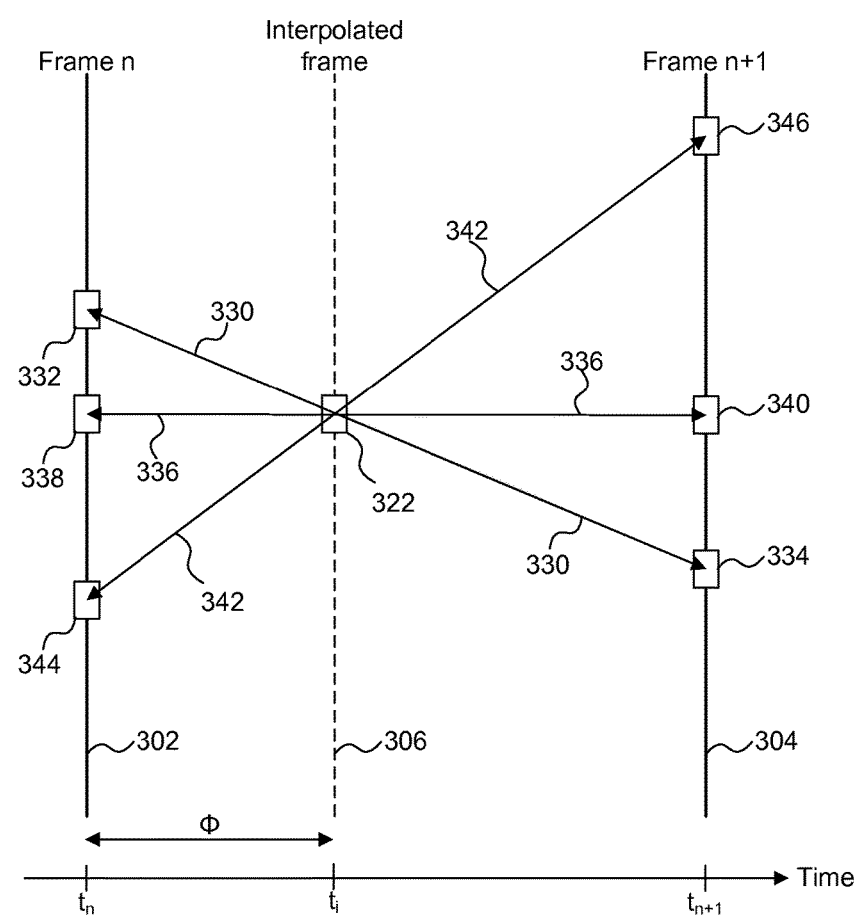
FIG. 3b shows a second example of motion vectors which may be calculated for an interpolated frame.

As another example, shown in FIG. 3b, another prediction for an area 322 of the interpolated frame 306 may be determined using "double-ended" motion vectors. Such a prediction is called a "bidirectional" prediction for the area 322 of the interpolated frame 306. The use of double-ended motion vectors produces exactly one predicted pixel value for each pixel position in the interpolated frame 306. In this case, the frame that is to be interpolated, 306, is divided into an array of blocks of pixels and motion estimation takes place for each block in turn. Therefore, in this example, the area 322 is a block of pixels which is aligned to a block grid of the interpolated frame 306. As an example, the double-ended motion estimation for block 322 of the interpolated frame 306 involves searching the previous and next existing frames (frames 302 and 304) in the video sequence for areas of pixel data that are most similar to each other. The search is constrained, in this example, by requiring that the areas tested are connected by a motion vector (e.g. a linear motion vector) which passes through the block 322 of the interpolated frame 306. Three candidate double-ended motion vectors for block 322 are shown in FIG. 3b as an example. The motion vector 330 represents motion from the area of pixels 332 in the frame 302 to the area of pixels 334 in the frame 304; the motion vector 336 represents motion from the area of pixels 338 in the frame 302 to the area of pixels 340 in the frame 304; and the motion vector 342 represents motion from the area of pixels 344 in the frame 302 to the area of pixels 346 in the frame 304. As an example, it may be found that the best match for all of the double-ended motion vectors which intersect the block 322 in the interpolated frame 306 is between pixel data areas 332 and 334, and in that case the motion vector 330 is selected for predicting the block 322 of the interpolated frame 306. That is, a prediction for the block 322 can be found using the motion vector 330, the values of the pixels in one or both of the areas 332 and 334 and the temporal phase, $\phi$.

In a case in which an interpolated frame is included at the midpoint between two existing frames of the video signal then the temporal phase, $\phi$, is 0.5 for that interpolated frame. There may be more than one interpolated frame included between two existing frames, and as such other interpolation phases may be used, for example interpolated frames may be generated at ¼, ½ and ¾ of the interval between existing frames.

It can therefore be appreciated that there is more than one way in which the image generator module 102 may determine a prediction of the interpolated frame 306 based on motion vectors and areas of pixel data from one or more of the existing frames of the video sequence. As well as the simple prediction methods described above (the forward, backward and bidirectional prediction methods), other, more complicated, prediction methods may be used. These alternative prediction methods are beyond the scope of this description. Usually these more complicated prediction methods make some additional assumptions about motion vectors in order to determine the prediction. This often makes the predictions of these more complicated prediction methods less reliable than the predictions of the simpler forward, backward or bidirectional prediction methods. However, there are some situations in which the more complicated prediction methods can be useful, as described below.

In one example, the image generator module 102 may determine a plurality of predictions of the pixels of the interpolated frame 306, e.g. using a plurality of different motion estimation methods such as those described above. Each prediction comprises predicted pixels for use in determining pixels representing the interpolated frame 306. A prediction may be a full image comprising all of the pixels for representing the interpolated frame 306, or a prediction may be a partial image comprising some but not all of the pixels for representing the interpolated frame 306. All of the predictions may be considered when the image generator module 102 determines the first motion-compensated image for representing an interpolated frame. In one example, the image generator module 102 may perform a clustering technique to determine the pixel values of the first motion-compensated image from the predictions. In a clustering technique the predicted values for a particular pixel from the different predictions are compared, and rules may be applied to determine a particular value for the pixel. For example, outliers may be removed and then an average of the remaining pixel values may be used to determine the pixel value. Precise details of how the pixels of the first motion-compensated image are determined from the predictions are beyond the scope of this description. The first motion-compensated image is outputted from the image generator module 102 and provided to the smoothing module 104, to the trust indications module 108 and to the combining module 114. However, as described herein, there may be artefacts, such halo artefacts, in the first motion-compensated image.

Figure 4:
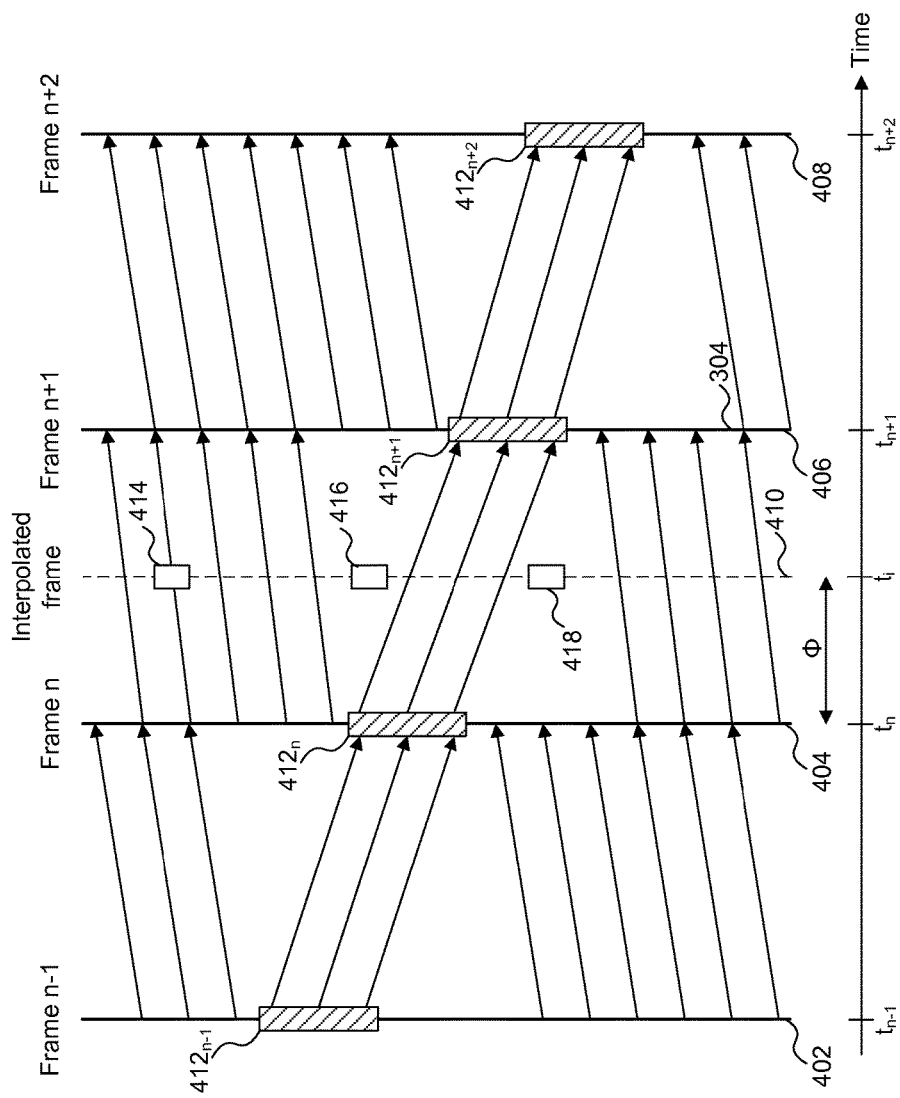
FIG. 4 shows an example of how an object may move between frames of the video sequence.

FIG. 4 shows four existing frames (frames 402, 404, 406 and 408) of a video sequence occurring respectively at times $t_{n-1}$, $t_n$, $t_{n+1}$ and $t_{n+2}$. FIG. 4 also shows an interpolated frame 410 which is to be generated at time $t_i$, which is between times $t_n$ and $t_{n+1}$, at an intermediate position (given by the temporal phase, $\phi$). In the simple example shown in FIG. 4, an object 412 is moving downwards whilst the background is moving upwards as the frames of the video sequence progress. In particular, the object 412 is at position $412_{n-1}$ in frame 402, and at position $412_n$ in frame 404, and at position $412_{n+1}$ in frame 406, and at position $412_{n+2}$ in frame 408. The arrows in FIG. 4 show motion vectors (which are single-ended motion vectors) between the existing frames of the video sequence. The motion vectors of the blocks of pixels representing the object 412 are angled slightly downwards in the example shown in FIG. 4. In contrast, in the example shown in FIG. 4, the background is moving gradually upwards through the frames of the video sequence and it can be seen that the motion vectors for blocks of pixels including background (i.e. not including the object 412 in the simple example shown in FIG. 4) are angled slightly upwards.

Some of the areas of pixels of the interpolated frame 410 can be predicted accurately using motion estimation as described above. For example, the pixel values of the area 414 of the interpolated frame 410 are likely to be predicted accurately using, for example, the forward prediction method described above. This is because the block 414 is in the middle of a region of the image which is moving with a consistent motion vector across the multiple frames shown in FIG. 4, and motion estimation is therefore likely to be accurate in that region.

However, the pixel values of the area 416 or the area 418 of the interpolated frame 410 may not be so easily predicted. The area 416 represents a revealed area of the image. That is, in the preceding existing frame (frame 404) the pixels in the region corresponding to area 416 were covered by the object 412, but due to the motion of the object 412, at time $t_i$ the object is no longer covering the same region, and as such those pixels have been revealed. Similarly, the block 418 represents an occluded area of the image. That is, in the subsequent existing frame (frame 406) the pixels in the region corresponding to area 418 are covered by the object 412, but due to the motion of the object 412, at time $t_i$ the object is not yet covering the same region. Since the motion estimation methods described above (i.e. the forward, backward or bidirectional prediction methods) rely on finding a match between areas of pixel data, the motion estimation is likely to fail in occluded or revealed areas of the image. Consequently prediction may fail entirely, or may interpolate inappropriate pixel data into the areas 416 and 418. This is likely to lead to visible artefacts in the interpolated frame 410.

Various alternative prediction techniques for interpolating in occluded or revealed areas exist. For example, spatial interpolation of pixel data within the interpolated frame 410 may be used to fill 'holes' in motion vector fields. Such techniques can be used successfully, but, since they are based on vectors derived at a different spatial location, tend to be less reliable than the more direct prediction methods. It may also be difficult to recognise when occluded or revealed areas are causing prediction errors, meaning that alternative predictions are not always applied when they could be of benefit.

From the example shown in FIG. 4, it can be appreciated that near the edges of moving objects in the video sequence, it can be difficult to predict the pixel values in interpolated frames using motion estimation. In particular, it can be difficult to predict the pixel values in revealed or occluded regions of the interpolated frame. This may lead to a situation in which the prediction methods which are used to predict pixels of the interpolated frame tend to switch to alternative methods for revealed or occluded regions as compared to other areas of the interpolated frame which may be moving with consistent motion vectors and are likely to be conventionally predicted. The combination of multiple predictions in order to deal with occlusions and/or revealed areas may lead to sharp 'rip and tear' artefacts (referred to as "halo artefacts") appearing in the interpolated frame. There are a number of contributing factors, but the halo artefacts are often caused by one or both of: (i) errors in the motion vectors, and (ii) errors arising from switching between different predictions.

Even with relatively small motion estimation and switching errors, there is a tendency to generate halo artefacts at points in the image where the motion vectors diverge or converge. The halo artefacts are highly visible in real-time viewing, particularly because they appear to move as the video sequence is played out. Often the middle of revealed or occluded regions may be predicted correctly by using one of the alternative, or more complicated techniques, but it remains difficult to remove the halo artefacts from the edges of the revealed or occluded regions and as such the overall perceptual appearance is that the size of the halos is the same, just that the edges of them have become more sharply defined.

Figure 5:
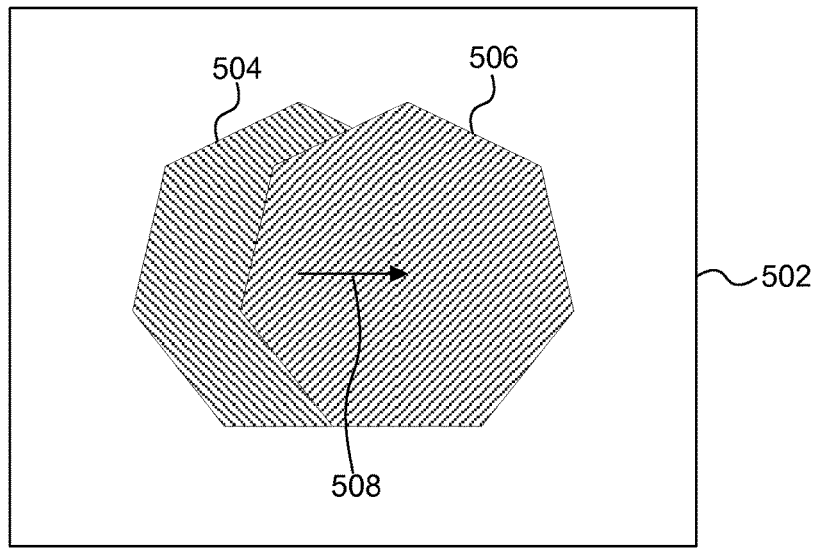
FIG. 5 represents the motion of an object between two successive frames of a video sequence.

For example, FIG. 5 shows a representation 502 which is an overlay of two successive existing frames of the video sequence, e.g. frame n and frame n+1.

The frames show a moving heptagonal object against a stationary background. The position of the object in frame n is shown with reference numeral 504, whilst the position of the object in frame n+1 is shown with reference numeral 506. The object has a motion vector 508 between the two frames.

Figure 6:
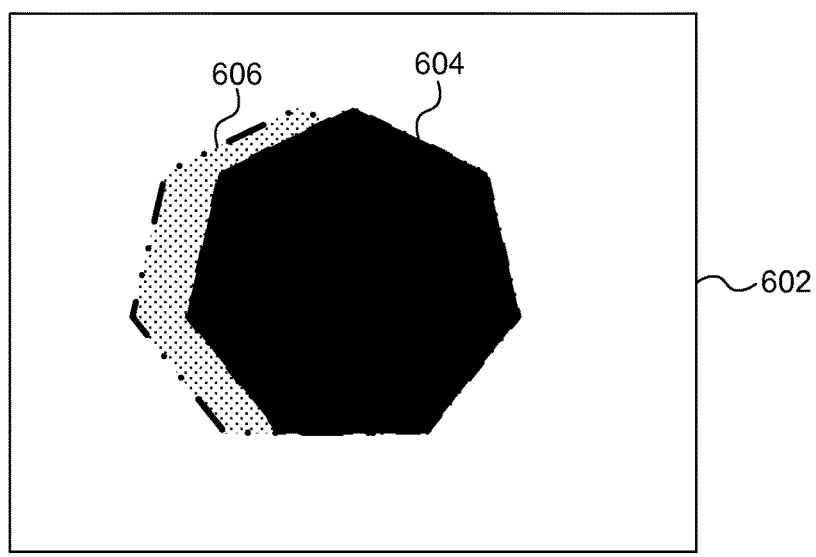
FIG. 6 represents a motion-compensated image for use in representing an interpolated frame.

FIG. 6 shows a motion compensated image 602 which is output from the image generator module 102 to represent an interpolated frame which is to be placed at the midpoint between the frame n and the frame n+1 in the video sequence, i.e. the temporal phase, ϕ, is 0.5. The image 602 shows the object (denoted 604 in FIG. 6), the position of which has been determined by linear interpolation based on the motion vector 508 and the temporal phase, such that the object 604 has a position in the image 602 which is half way between the positions of the object in the frames n and n+1 (i.e. positions 504 and 506). FIG. 6 also represents a halo artefact 606 which, as described above, may be caused by errors in motion vectors and/or switching errors between different prediction methods in the revealed region which is revealed as the object moves. As is represented in FIG. 6, the halo artefacts are strong at the edge of the revealed region, but may be substantially corrected near the centre of the revealed region.

As described above, the first motion-compensated image (e.g. image 602) is outputted from the image generator module 102 and received at the trust indications module 108. Furthermore, some side information may be passed from the image generator module 102 to the trust indications module 108. The side information may include indications of the results of the different predictions of the image 602. In step S206 the trust indications module 108 determines trust indications for the pixels of the image 602. The trust indications may be determined for some or all of the pixels of the image 602. The trust indications may be determined in accordance with a determination of the predictions, e.g. based on the side information received from the image generator module 102. A trust indication for a pixel indicates a level of trust in the value of that pixel in the image 602. The trust indications may be considered to be "confidence" indications, indicating levels of confidence in the values of the pixels in the first motion-compensated image 602. That is, the trust indications indicate likelihoods that artefacts will be apparent in the pixels of the image 602.

Figure 7:
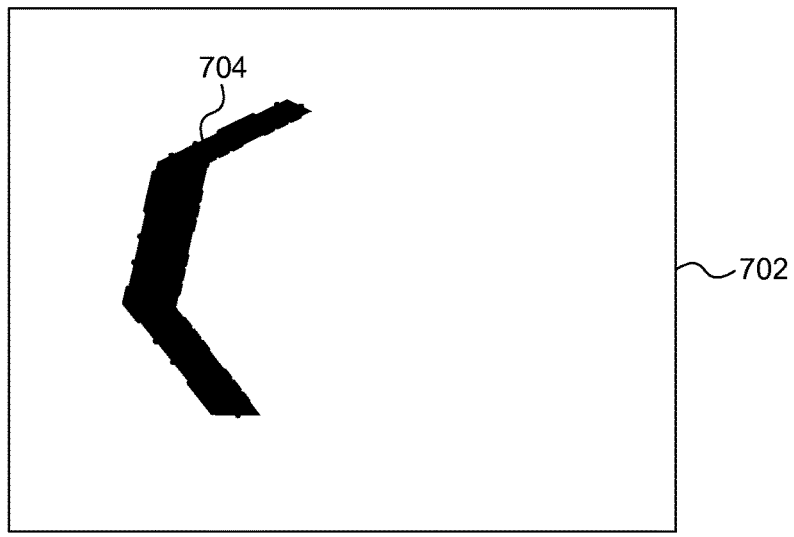
FIG. 7 represents trust indications of pixels of a motion-compensated image.

For example, FIG. 7 shows an array of trust indications 702 which have been determined for the pixels of the image 602. The trust indications in this example either have a value of one or a value of zero. In this way, each trust indication can be represented with one bit, e.g. a one-bit flag. In the example shown in FIG. 7, white (e.g. a trust indication value of zero) indicates a trusted pixel, and black (e.g. a trust indication value of one) indicates an untrusted pixel. It can be seen that most of the pixels in the image 602 are trusted, but there is a region of trust indications 704 (an "untrusted region") indicating that the pixels in the halo region 606 of the image 602 are untrusted. In this example, a high value of a trust indication (e.g. a value of one) indicates a low level of trust in the pixel value of the image 602, whilst a low value of a trust indication (e.g. a value of zero) indicates a high level of trust in the pixel value of the image 602. However, in other examples, a high value of a trust indication (e.g. a value of one) indicates a high level of trust in the pixel value of the image 602, whilst a low value of a trust indication (e.g. a value of zero) indicates a low level of trust in the pixel value of the image 602. Furthermore, in some examples the trust indications are represented with more than one bit so that more than two different levels of trust can be indicated by the trust indications.

The trust indications module 108 may determine the trust indications in any suitable manner such that the determined trust indications indicate levels of trust in the values of the pixels in the image 602. For example, the side information that is passed from the image generator module 102 to the trust indications module 108 may indicate the results of each of the different predictions made for the pixels of the image 602, wherein the trust indication for a pixel may be determined based on the differences between the values for that pixel from the different predictions. Where a clustering technique is used in the image generator module 102, the side information may indicate how many of the predictions agreed with the particular pixel value in the image 602. Rules may be applied to set the trust indications based on the clustering of the different predictions. These rules may be set empirically, based on observations. For example, where a clustering technique has been used to cluster the different predictions for the pixel values, the sizes of the clusters (i.e. the number of predictions in the clusters) can be used to set each of the trust indications to either one or zero.

In a trivial example, if all of the prediction methods agree on a pixel value (e.g. such that there is just one cluster) then the pixel value is trusted and the trust indication for that pixel is set accordingly. For example, there may be seven prediction methods. In another trivial example, if none of the prediction methods agree on a pixel value (e.g. such that there are seven clusters) then the pixel value is untrusted and the trust indication for that pixel is set accordingly. Between these two extremes the rules for setting the trust indications may be determined based on what appears to give the best results. For example, if there are three clusters for a pixel with sizes 4, 1 and 1 (that is, the largest cluster includes four predictions, and the other clusters both include one prediction) then that pixel may be trusted and the trust indication for that pixel is set accordingly. It is noted that the numbers of predictions in the clusters for a pixel do not necessarily add up to the total number (e.g. seven) of predictions considered because for some pixels one or more of the prediction methods may not predict a value. In another example, if there are four clusters for a pixel with sizes 2, 2, 2 and 1 (that is, the three largest clusters each include two predictions, and the other cluster includes one prediction) then that pixel may be untrusted and the trust indication for that pixel is set accordingly.

In other examples, the trust indications may be determined in other ways, e.g. not based on the clustering technique. For example, the trust indications may be determined by analysing the image 602 to identify pixels which include artefacts, such as halo artefacts, and to set the trust indications for those pixels to indicate that the pixels are untrusted. Alternatively, the motion vector fields used to create the projections that were used to form the image 602 may be analysed to identify occluded and revealed areas. The trust indications may be determined in a "safe" way, in that, in situations of doubt, there is a bias towards setting an indication that a pixel is trusted compared to setting an indication that a pixel is untrusted. This is because it may be more detrimental to the perceptual quality of the final output frame to mis-identify a trusted pixel as untrusted than it would be to mis-identify an untrusted pixel as trusted.

The trust indications are passed from the trust indications module 108 to the smoothing module 110. In step S208 the smoothing module 110 (in particular the smoothing filter 112) smoothes the trust indications, e.g. by applying a filter such as a low-pass filter to the trust indications. The trust indications are smoothed to remove high frequency fluctuations in the trust indications. It is useful to remove the high frequency fluctuations because such fluctuations may lead to sharp artefacts in an image, which are perceptually more noticeable than smoothed artefacts which do not exhibit such strong edges. It may be appreciated that the determination of the trust indications in step S206 may not always be perfectly accurate. However, the smoothing of the trust indications will reduce the effect of inaccuracy in the determination of the trust indications.

Figure 8:
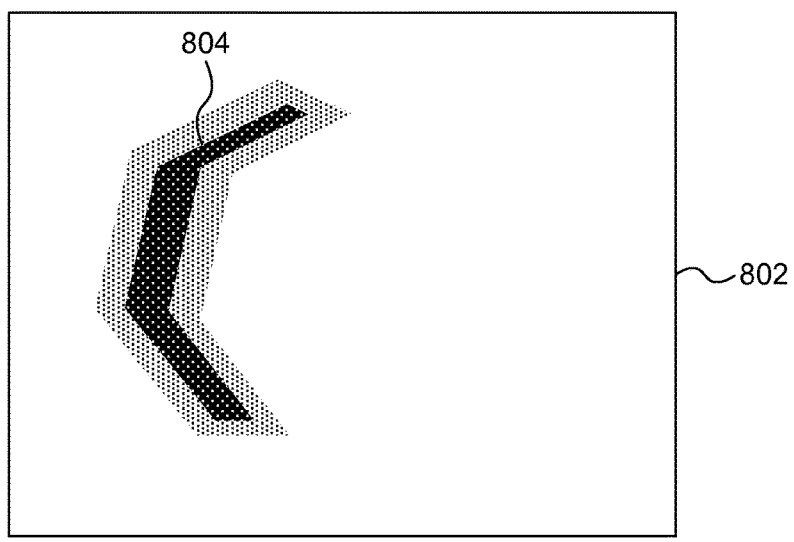
FIG. 8 represents smoothed trust indications of pixels of a motion-compensated image.

FIG. 8 shows an array of smoothed trust indications 802. It can be seen that the region 704 has been smoothed to give a region 804. The values of the smoothed trust indications may be in the range from zero to one, and will comprise of more than one bit to allow for values between zero and one. In one example, the values of the smoothed trust indications for trusted regions (shown as white in FIG. 8) will be equal to zero or at least approximately equal to zero. Near the centre of the region 804 the trust indications will be high and may be equal to one or approximately equal to one. There may be a smooth transition between the smoothed trust indications near the centre of the region 804 and the smoothed trust indications away from the region 804. Therefore the edges of the region 804 will have trust indication values somewhere between zero and one. The number of bits used for each of the smoothed trust indications sets the possible different values that the smoothed trust indications can take. For example, if n bits are used to represent each of the smoothed trust indications (where n is an integer) then the possible values that can be taken by each of the trust indications are given by $$\frac{m}{2^n - 1},$$

where m is an integer in the range: $0 \leq m \leq 2^n - 1$. For example, if 2 bits are used to represent each of the smoothed trust indications (i.e. if n=2) then the possible values that can be taken by each of the smoothed trust indications are 0, ⅓, ⅔ and 1.

The smoothing filter 112 is a low-pass filter which has a filter window which includes a filter kernel determining how the trust indications are smoothed. For example, the smoothing filter 112 may be a two dimensional filter and as an example its filter window may include a filter kernel with a size of 15×15 pixel positions. The larger the filter kernel the more the trust indications are smoothed (or "blurred") by the smoothing process. The filter kernel may be square as in the example given above, but in other examples the filter kernel may have a different shape (e.g. rectangular), which may allow the trust indications to be filtered in one direction to a greater extent than they are filtered in another direction. The coefficients of the filter kernel may be constant over the window, to provide an averaging (or 'box') filter. Alternatively, the coefficients may vary, for example, in the case of a square window, to provide a filter such as a circularly symmetric Gaussian. Furthermore, the size of the filter kernel may be adaptable. For example, the size of the filter kernel may be adapted based on the width of the region 704, that is, based on the width of the halo artefact in the image 602. For a narrower halo artefact, a smaller filter kernel may be chosen so that the trusted indications are not blurred as much. In contrast, for a wider halo artefact, a larger filter kernel may be chosen so that the trusted indications are blurred over a greater range. Many suitable smoothing filters are "separable", meaning that a two dimensional filter may be implemented as a pair of one dimensional filters operating independently on each axis to give an equivalent result in fewer operations. Other filters are not truly separable, but may be approximated sufficiently closely by a pair of one dimensional filters. The two dimensional smoothing filter 112 may be implemented as a pair of one dimensional filters.

The smoothed trust indications are provided from the smoothing module 110 to the combining module 114.

The motion-compensated image outputted from the image generator module 102 is also provided to the smoothing module 104. In step S210 the smoothing module 104 (in particular the smoothing filter 106) smoothes the image 602, e.g. by applying a filter such as a low pass filter to the image 602. The image 602 is smoothed to remove high frequency fluctuations in the pixel values of the image 602. This will blur out areas of detail in the image 602 and will reduce the effect of sharp artefacts which have well-defined edges, such as the halo artefacts, in the image 602. Whilst the smoothing of the image 602 will reduce the effect of the halo artefacts, it will also reduce the level of detail that can be seen in correctly predicted regions of the image 602.

Figure 9:
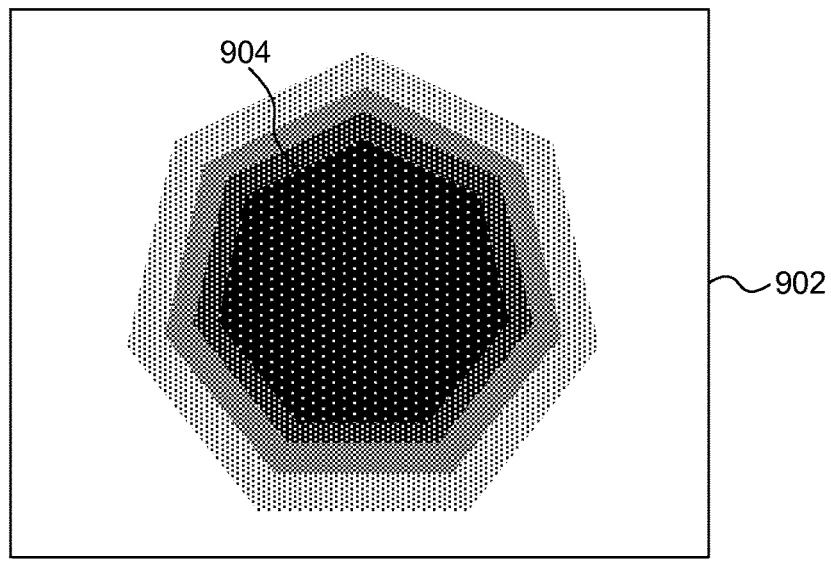
FIG. 9 represents a smoothed motion-compensated image for use in representing an interpolated frame.

FIG. 9 shows a representation of a smoothed version (indicated with reference numeral 902) of the image 602. The "smoothed image" may also be referred to herein as a "soft image". The smoothed image 902 includes the smoothed object 904. FIG. 9 is a simplified diagram showing that the object has been smoothed, such that the edges of the smoothed object 904 are not sharply-defined, but the sharpness of the halo artefacts has also been reduced.

The smoothing filter 106 is a low-pass filter which has a filter window which includes a filter kernel determining how the image 602 is smoothed. For example, the smoothing filter 106 may be a two dimensional filter and as an example its filter window may include a filter kernel with a size of 15×15 pixel positions. The larger the filter kernel the more the image 602 is smoothed (or "softened", or "blurred") by the smoothing process. The filter kernel may be square as in the example given above, but in other examples the filter kernel may have a different shape (e.g. rectangular), which may allow the image 602 to be filtered in one direction to a greater extent than it is filtered in another direction. The coefficients of the filter kernel may be constant over the window, to provide an averaging (or 'box') filter. Alternatively, the coefficients may vary, for example, in the case of a square window, to provide a filter such as a circularly symmetric Gaussian. Furthermore, the size of the filter kernel may be adaptable. For example, the size of the filter kernel of the smoothing filter 106 may be adapted based on the width of the region 704, that is, based on the width of the halo artefact in the image 602. For a narrower halo artefact, a smaller filter kernel may be chosen so that the image 602 is not blurred as much. In contrast, for a wider halo artefact, a larger filter kernel may be chosen so that the image 602 is blurred over a greater range. The size of the filter kernel of the smoothing filter 106 used to smooth the image 602 may be different to the size of the filter kernel of the smoothing filter 112 used to smooth the trust indications. Furthermore, the size of the filter kernel of the smoothing filter 106 used to smooth the image 602 may adapted independently to the size of the filter kernel of the smoothing filter 112 used to smooth the trust indications. The smoothing filter 106 may be implemented as a pair of one dimensional filters when this provides an equivalent result or a sufficiently close approximation to the desired two dimensional filter kernel.

The filtering implemented by the smoothing filters 106 and 110 is spatial averaging. That is, the filtering is applied in the spatial domain.

The smoothed image 902 is a motion-compensated image. This means that the motion of the objects from the previous existing frame to the image 902 is interpolated according to the motion vector field, but the high frequency detail is lost in the image 902 due to the low-pass filtering of the smoothing filter 106. Smoothed image 902 therefore provides a source of pixels that may be combined with another motion compensated image (e.g. unsmoothed image 602) without risk of discontinuities due to mismatched motion, while the smoothing reduces the visibility of artefacts such as halos. The smoothed motion-compensated image 902 is provided from the smoothing module 104 to the combining module 114. Furthermore, the motion-compensated image 602 (i.e. the unsmoothed image) is provided from the image generator module 102 to the combining module 114.

Figure 10:
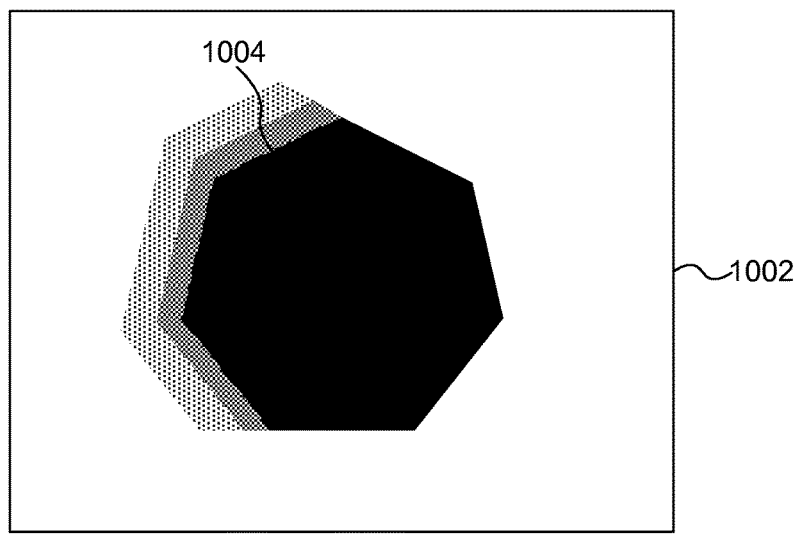
FIG. 10 represents an output frame.

In step S212 the combining module 114 generates the output frame (i.e. the interpolated frame) by using the smoothed trust indications 802 to selectively combine the image 602 and the smoothed image 902. FIG. 10 shows an example of the output frame 1002, which comprises the object (denoted with reference 1004 in FIG. 10).

Pixels of the output frame may be determined by performing weighted sums of the corresponding pixels of the images 602 and 902, wherein the weights of the weighted sums are derived from the smoothed trust indications. For example, the value of a pixel I(x,y) at a position given by the pixel coordinates (x,y) in the interpolated frame 1002 may be given by:

$$I(x,y)=f(x,y)\times I_{smoothed}(x,y)+(1-f(x,y))\times I_{unsmoothed}(x,y)$$

where f(x,y) is the value of the smoothed trust indications at pixel coordinates (x,y), $I_{smoothed}(x,y)$ is the value of the smoothed image 902 at pixel coordinates (x,y) and $I_{unsmoothed}(x,y)$ is the value of the image 602 at pixel coordinates (x,y). In this case, and in accordance with the examples described above, the trust indications are high when there is a low level of trust in the pixel values of the image 602. That is, a trust indication of f(x,y)=1 means that the pixel of image 602 at coordinates (x,y) is completely untrusted, and a trust indication of f(x,y)=0 means that the pixel of image 602 at coordinates (x,y) is completely trusted.

In other examples, the trust indications may be high when there is a high level of trust in the pixel values of the image 602. In this case the trust indications may be denoted as f'(x,y) and the equation above is modified slightly, such that:

$$I(x,y)=f'(x,y)\times I_{unsmoothed}(x,y)+(1-f'(x,y))\times I_{smoothed}(x,y)$$

In this example, a trust indication of f'(x,y)=1 means that the pixel of image 602 at coordinates (x,y) is completely trusted, and a trust indication of f'(x,y)=0 means that the pixel of image 602 at coordinates (x,y) is completely untrusted.

It can therefore be appreciated that the smoothed trust indications 802 are used to adaptively mix between the unsmoothed image 602 and the smoothed image 902 to generate the output frame, in such a way that high frequency artefacts (e.g. halo artefacts) are largely suppressed in the output frame.

Pixels of the output frame which are completely trusted (i.e. f(x,y)=0 or f'(x,y)=1) are given simply by the corresponding pixels of the unsmoothed image 602. It is possible that all of the pixels in the unsmoothed image 602 are completely trusted, in which case the output frame is the same as the image 602. However, in any untrusted regions of the image 602 (i.e. regions in which the pixels are not completely trusted, that is f(x,y)≠0 or f'(x,y)≠1) then the pixel values of the output frame depend upon the corresponding pixels of the smoothed image 902, to an extent which is given by the trust indications.

For regions of the interpolated frame 1002 which correspond to trusted regions of the image 602 (as indicated by the trust indications) the detail in the interpolated frame 1002 is the same (or at least substantially similar) to the detail in the image 602 output from the image generator module 102. In this way, detail is not lost in trusted regions of the image. However, for untrusted regions of the image 602, the smoothed image 902 is used (e.g. in combination with the image 602) to determine the pixels of the output image. This reduces the sharpness of the artefacts (e.g. halo artefacts) in the untrusted regions. By reducing the sharpness of the artefacts, the artefacts are less perceptually disturbing to a viewer of the video sequence as it is played out.

The trust indications may be computed before the image 602 is smoothed by the smoothing module 104. In some examples, the smoothed image 902 is not needed for trusted regions, and as such the smoothed image 902 might not be calculated for the trusted regions. This would reduce the time and processing power used to calculate the smoothed image 902 in the smoothing module 104. In these examples, a determination as to which areas of the image 602 the smoothing module 104 is to apply the smoothing to is made based on the trust indications: the trust indications being either the unsmoothed trust indications 702 output from the trust indications module 108 or the smoothed trust indications 802 output from the smoothing module 110.

The interpolated frame 1002 is outputted from the combining module 114. The interpolated frame may be included in the appropriate position within the video sequence. The video sequence may be passed for further processing in a further processing block (not shown in FIG. 1) or may be passed to a memory (not shown in FIG. 1) for storage therein.

The method of generating the interpolated frame could be performed in real-time as the video sequence is being outputted. Alternatively, the method of generating the interpolated frame could be performed prior to the outputting of the video sequence, such that the video sequence, including the interpolated frames, can be stored in a memory for subsequent playback.

The examples described herein are successful at reducing the subjective appearance of halo artefacts in a benign manner that does not leave sharp rips and tears in the output images. It works particularly well on soft backgrounds, and although it does soften more detailed backgrounds in the untrusted regions around objects, the resulting soft background region is generally perceptually less distorted than other methods for reducing the effect of halo artefacts, and the soft background region is motion-compensated.

There is a possibility that an edge of the object 1004 is softened near the untrusted region. However, it is not unusual that the motion vector field (and thus the halo edge, since the position of the halo is determined by the motion vectors, e.g. the divergence or convergence of the motion vectors) does not align exactly with the edge of the object. This may be because the motion estimation is performed in a block-wise manner, wherein the edge of the object may pass within a block but the whole block is assigned a common motion vector. It is therefore not uncommon for a small amount of background to be dragged with the moving object (or vice versa). In these situations, the softening of the object's edge may actually help to reduce the visible effect caused by the unwanted dragging of background. Furthermore, when halo artefacts are appreciable, the moving object often has a certain amount of motion blur, and thus the effect of a small amount of softening of the edges of the object caused by the methods described herein to address the halo artefacts often just blends in with the motion blur.

In the examples given above, the trust indications indicate untrusted regions which correspond to the whole of the revealed or occluded areas of the interpolated frame. However, as described above, the centre of the revealed or occluded areas are often predicted with much fewer artefacts than the edges of the revealed or occluded areas. It may therefore be beneficial to focus the blurring of the image just on the edges of the untrusted regions, rather than over the whole of the untrusted regions. Therefore, in other examples, the trust indications may be used to determine the position of an edge of an untrusted region of the first motion-compensated image, and then the first motion-compensated image and the smoothed motion-compensated image are selectively combined in accordance with the determined position of the edge of the untrusted region of the first motion-compensated image. For example, the edges of the untrusted regions could be found by determining the derivative of the trust indications. The derivative is high at the edges of the untrusted regions. Therefore, the derivative of the trust indications can be used in a weighted sum, similar to that described above, to determine how the unsmoothed image 602 and the smoothed image 902 are combined to produce the output frame. In particular, where the derivative of the trust indications is high (i.e. at the edges of the untrusted regions) then the pixels of the interpolated image are strongly weighted towards the smoothed image 902, and where the derivative of the trust indications is low (i.e. not at the edges of the untrusted regions) then the pixels of the interpolated image are strongly weighted towards the unsmoothed image 602. The derivative of the trust indications may be the derivative of the unsmoothed trust indications 702 or the derivative of the smoothed trust indications 802. In another example, which does not use the determination of the derivative of the trust indications, the trust indications may only be set to the "untrusted" value at the edges of the untrusted region 606 and not at the centre of the untrusted region 606.

If the untrusted region is small then the halo artefacts tend to be less obvious to a viewer of the video sequence. Therefore, for small halo regions (that is, for small untrusted regions) it may be preferable not to use the smoothed image 902 when determining the output frame 1002 to avoid blurring in the output frame 1002. Therefore, the combination of the first motion-compensated image and the smoothed motion-compensated image may be further based on the size of the untrusted region of the image 602.

For example, if the size of the untrusted region 606 in the image 602 is smaller than a threshold size then the pixels in the output frame corresponding to the untrusted region are generated using the unsmoothed image 602 but not using the smoothed image 902. However, if the size of the untrusted region 606 is greater than the threshold size then the pixels in the output frame corresponding to the untrusted region are generated using a combination of the unsmoothed image 602 and the smoothed image 902.

The "size" of an untrusted region may be calculated in a number of different ways. Furthermore, the "size" of an untrusted region may refer to any suitable measure of size, e.g. the area of the untrusted region or the length of one or more particular dimensions of the untrusted region. For example, the size of the untrusted region may be determined by determining the width of the untrusted region, that is, the perpendicular distance (e.g. average or maximum perpendicular distance) from the edge of the object to the further edge of the untrusted region.

Figure 11:
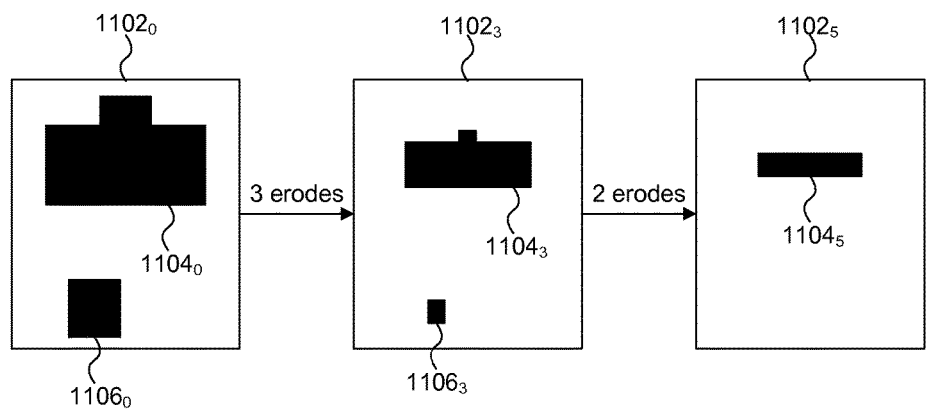
FIG. 11 shows the effects of performing erode operations on trust indications in an example.

In another example the size of the untrusted region is determined by performing one or more erode operations on the trust indications (either the unsmoothed trust indications, e.g. 702, or the smoothed trust indications, e.g. 802) for the pixels of the untrusted region. In an example, the erode operations are performed on unsmoothed, one-bit trust indications, such as the trust indications 702. An erode operation shrinks the size of the untrusted region by removing a layer of pixels from the outer edge of the untrusted region. The erode operation may be repeated multiple times (e.g. five times). If the untrusted region is small then following the erode operation(s) the untrusted region may have disappeared, i.e. been completely eroded. FIG. 11 shows an example of applying erode operations to an array of one-bit trust indications 1102 which includes two untrusted regions 1104 and 1106 of different sizes. Before any erode operations are applied the trust indications $1102_0$ include two untrusted regions $1104_0$ and $1006_0$. As can be seen in FIG. 11 the untrusted region $1104_0$ is larger than the untrusted region $1106_0$. FIG. 11 also shows the trust indications $1102_3$ after three erode operations have been performed. It can be seen that the untrusted regions $1104_3$ and $1104_3$ have been eroded relative to the initial regions $1104_0$ and $1106_0$. FIG. 11 also shows the trust indications $1102_5$ after a total of five erode operations have been performed. It can be seen that the untrusted regions $1104_5$ has been eroded relative to the region $1104_3$ and it can be seen that the untrusted region 1106 has been completely eroded after five erode operations. The number of erode operations that are applied may therefore be chosen according to the threshold size below which an untrusted region is considered to be small.

Figure 12:
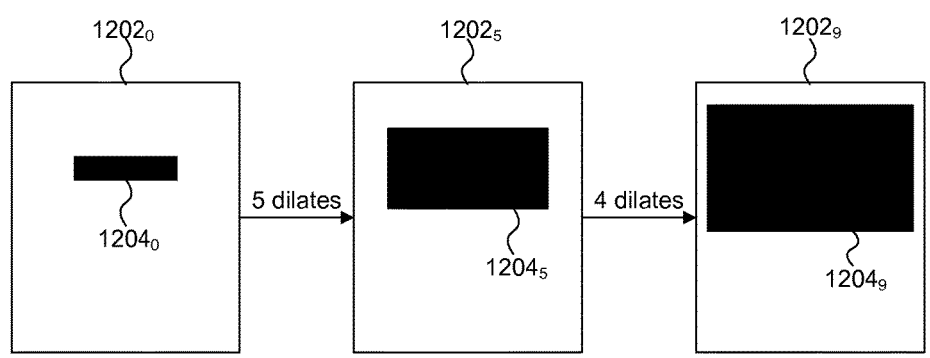
FIG. 12 shows the effects of performing dilate operations of the results of the erode operations in the example.

Multiple dilate operations can then be applied to the remaining untrusted region (if it still remains) to generate a key signal. The key signal is an array of binary values. A dilate operation is a complementary function to the erode operation. That is, a dilate operation adds a layer of pixels to the outer edge of the untrusted region to thereby grow the untrusted region. FIG. 12 shows an example of applying dilate operations to the results of the erode operations shown in FIG. 11. Initially, before dilate operations are applied, the key signal $1202_0$ is the same as the result of the erode operations $1102_5$, with an untrusted region $1204_0$. FIG. 12 shows the key signal $1202_5$ after five dilate operations have been applied. It can be seen that the key signal $1202_5$ is not the same as the trust indications $1102_0$ after the same number of erode operations and dilate operations have been performed. In particular, the small untrusted region $1106_0$ does not show up in the key signal $1202_5$ because the untrusted region $1106_0$ was too small to remain after the five erode operations have been performed. Furthermore, the shape of the untrusted region $1104_0$ before any erode operations are performed is not the same as the shape of the untrusted region $1204_5$ after five erode and five dilate operations have been performed. That is, the fine detail of the shape of the region $1104_0$ has been lost. As will become apparent from the explanation below, the region 1204 after the dilate operations have been performed is intended to cover the untrusted regions which are large enough to survive the erode operations (e.g. untrusted region 1104, but not untrusted region 1106). For this reason, the number of dilate operations applied to create the key signal is approximately equal to, or larger than the number of erode operations that were applied. FIG. 12 shows the key signal $1202_9$ after nine dilate operations have been performed. It can be seen that in this example, nine dilate operations is enough for the region $1204_9$ in the key signal $1202_9$ to completely cover the untrusted region $1104_0$ in the trust indications $1102_0$ prior to the erode operations. The erode and dilate operations may be performed by the combining module 114. The key signal indicates regions which are not in the proximity of untrusted regions which are larger than the threshold size (such regions are white in the example shown in FIG. 12), and the pixels of the interpolated frame 1006 in such regions may be generated without performing the weighted sum, i.e. just using pixels of the unsmoothed image 602 but not using pixels of the smoothed image 902.

For pixel positions at which the key signal $1202_9$ is zero (i.e. white in the example shown in FIG. 12) the unsmoothed image 602 may be used, without the smoothed image 902, to determine the pixel values of the interpolated frame 1002. That is because the key signal $1202_9$ being zero indicates that there is not an untrusted region in the trust indications which is larger than the threshold size. In contrast, for pixel positions at which the key signal $1202_9$ is one (i.e. black in the example shown in FIG. 12) the unsmoothed image 602 and the smoothed image 602 are selectively combined as described above, to determine the pixel values of the interpolated frame 1002. That is because the key signal $1202_9$ being one indicates that there is an untrusted region in the trust indications which is larger than the threshold size. Using the key signal in this way reduces the number of weighted sums that are performed by eliminating small untrusted regions which are smaller than the threshold size.

In the example shown in FIGS. 11 and 12, five erode operations are applied, and nine dilate operations are applied. In other examples different numbers of erode and/or dilate operations may be performed. The number of erode and dilate operations that are applied may be adaptable. The key signal which is generated has an array of values (of either one or zero) corresponding to the pixel positions of the image. The region of the key signal corresponding to the untrusted region of the trust indications will be larger than the untrusted region of the trust indications (because more dilate operations than erode operations were performed) unless the erode operations made the region completely disappear, i.e. unless the size of the untrusted region is below a threshold size. The threshold size in this case is the minimum size that will not be completely eroded by the erode operations. It is intended that the region 1204 following the dilate operations covers the untrusted region 1104 prior to the erode operations. The ratio of the number of dilate operations to the number of erode operations may be controlled. Increasing this ratio (e.g. from 9:5 as in the example above) will increase the size of the region 1204 following the dilate operations relative to the size of the untrusted region 1104 prior to the erode operations. This may be considered to be "safer" in the sense that it is less likely that the region 1204 will not cover all of the untrusted region 1104, but this would also reduce the benefit of using the key signal since more of the pixel positions will be covered by the region 1204 such that more weighted sums may be performed. Increasing the number of dilate operations (e.g. from nine to twenty) may allow for more complex shapes of the untrusted region 1104 to still be covered by the region 1204 of the key signal. The equation above can be modified to take account of the sizes of the untrusted regions, such that, the value of a pixel I(x,y) at a position given by the pixel coordinates (x,y) in the interpolated frame 1002 may be given by:

$$I(x,y) = f(x,y)m(x,y) \times I_{smoothed}(x,y) + (1-f(x,y)m(x,y)) \times I_{unsmoothed}(x,y)$$

where f(x,y) is the value of the smoothed trust indications prior to the erode operations (e.g. the smoothed trust indications 704) at pixel coordinates (x,y), m(x,y) is the value of the key signal at pixel coordinates (x,y), $I_{smoothed}(x,y)$ is the value of the smoothed image 902 at pixel coordinates (x,y) and $I_{unsmoothed}(x,y)$ is the value of the image 602 at pixel coordinates (x,y).

In examples given above a trust indication is determined for each pixel position within the image. However, in other examples, the trust indications may be determined for some, but not all, of the pixel positions within the image. For example, the trust indications could be determined only for regions of the image which have been determined to include artefacts, and therefore are likely to be untrusted. In these examples, for pixel positions which do not have a trust indication it may be assumed that the corresponding pixels in the image 602 are to be trusted.

In the examples given above the image generator module 102 is shown as a separate module to the trust indications module 108. However, in some examples, the functionality of the two modules 102 and 108 could be implemented within one module. For example, the trust indications module 108 could be implemented within the image generator module 102 such that the image generator module 102 provides the first motion-compensated image 602 and the trust indications 702 as outputs which can then be processed as described above in the rest of the frame generator 100.

As described above, the trust indications are used to determine whether and how to combine the pixel values of the image 602 and the smoothed image 902 to generate the pixels of the interpolate frame 1002. In the examples given above, the trust indications are smoothed by the smoothing module 110 before they are used to combine the pixels of the images 602 and 902. However, in other examples, the trust indications might not be smoothed before being used to combine the pixels of the images 602 and 902. That is the trust indications may be passed from the trust indications module 108 to the combining module 114, without being smoothed. In these examples the smoothing module 110 would not need to be implemented in the frame generator 100. This might not provide such good results in removing the halo artefacts from the image 602, but it may be simpler to implement the frame generator 100 without the smoothing module 110.

As mentioned above, the examples described herein relate to systems operating on complete frames. All of the methods described may equally be applied to video sequences comprising fields or complete frames, and the use of the term "frame" should be understood to refer to either complete frames or fields as appropriate.

Generally, any of the functions, methods, techniques or components described above can be implemented in modules using software, firmware, hardware (e.g., fixed logic circuitry), or any combination of these implementations. The terms "module," "functionality," "component" and "logic" are used herein to generally represent software, firmware, hardware, or any combination thereof.

In the case of a software implementation, the module, functionality, component or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processor configured to perform any of the methods described herein, or for generating a processing unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of generating an output frame for inclusion in a video sequence that comprises a plurality of existing frames, the method comprising:
using at least one prediction based on at least one of the existing frames of the video sequence to generate a first motion-compensated image for representing the output frame;
determining trust indications for pixels of the first motion-compensated image, said trust indications indicating levels of trust in the values of said pixels of the first motion-compensated image;
smoothing, in the spatial domain, at least part of the determined first motion-compensated image to determine a smoothed motion-compensated image; and
generating the output frame by using the determined trust indications for the pixels of the first motion-compensated image to selectively combine the first motion-compensated image and the smoothed motion-compensated image.

2. The method of claim 1 wherein the at least one prediction comprises a plurality of predictions, and wherein each of the predictions comprises predicted pixels for use in determining pixels representing the output frame.

3. The method of claim 2 further comprising determining the predicted pixels by predicting areas of pixels of the output frame using motion vectors and areas of pixels in one or more of the existing frames.

4. The method of claim 1 wherein the trust indications are determined in accordance with a determination of the at least one prediction.

5. The method of claim 2 wherein the trust indications are determined in accordance with a determination of the at least one prediction, and for the pixels of the first motion-compensated image based on differences between values for corresponding predicted pixels of different ones of the predictions.

6. The method of claim 1 wherein a trust indication is determined for each pixel of the first motion-compensated image.

7. The method of claim 1 wherein each of the trust indications is a one-bit value which indicates that the value of a pixel of the first motion-compensated image is either trusted or untrusted.

8. The method of claim 1 further comprising using the trust indications to determine the position of an edge of an untrusted region of the first motion-compensated image, wherein the first motion-compensated image and the smoothed motion-compensated image are selectively combined in accordance with the determined position of the edge of the untrusted region of the first motion-compensated image.

9. The method of claim 1 wherein the combination of the first motion-compensated image and the smoothed motion-compensated image is further based on the size of an untrusted region of the first motion-compensated image.

10. The method of claim 9 wherein,
when the size of the untrusted region is smaller than a threshold size the pixels in the output frame corresponding to the untrusted region are generated using the first motion-compensated image but not using the smoothed motion-compensated image, and when the size of the untrusted region is greater than the threshold size the pixels in the output frame corresponding to the untrusted region are generated using a combination of the first motion-compensated image and the smoothed motion-compensated image;
wherein the method further comprises:
determining whether the size of the untrusted region is smaller than or greater than the threshold size by performing one or more erode operations on the trust indications for the pixels of the untrusted region; and performing one or more dilate operations on the result of the erode operations to thereby form a key signal which indicates regions which are not in the proximity of untrusted regions which are larger than the threshold size, such that the pixels in the indicated regions can be generated using the first motion-compensated image but not using the smoothed motion-compensated image.

11. A frame generator configured to generate an output frame for inclusion in a video sequence which comprises a plurality of existing frames, the frame generator comprising:
an image generator module configured to use at least one prediction based on at least one of the existing frames of the video sequence to generate a first motion-compensated image for representing the output frame;
a trust indications module configured to determine trust indications for pixels of the first motion-compensated image, said trust indications indicating levels of trust in the values of said pixels of the first motion-compensated image;
a smoothing module configured to spatially smooth at least part of the determined first motion-compensated image to determine a smoothed motion-compensated image; and
a combining module configured to generate the output frame by using the determined trust indications for said pixels of the first motion-compensated image to selectively combine the first motion-compensated image and the smoothed motion-compensated image.

12. The frame generator of claim 11 wherein the smoothing module comprises a first smoothing filter configured to smooth the determined first motion-compensated image, wherein the size of a filter kernel of the first smoothing filter is adaptable.

13. The frame generator of claim 11 further comprising a second smoothing module configured to smooth the trust indications, wherein the combining module is configured to selectively combine the first motion-compensated image and the smoothed motion-compensated image in accordance with the smoothed trust indications for the pixels of the first motion-compensated image.

14. The frame generator of claim 13 wherein the second smoothing module comprises a second smoothing filter configured to smooth the trust indications, wherein the size of a filter kernel of the second smoothing filter is adaptable.

15. The frame generator of claim 13 wherein the combining module is configured to generate the output frame by, for each of a plurality of pixels of the output frame, performing a weighted sum of the corresponding pixels of the first motion-compensated image and the smoothed motion-compensated image, wherein the combining module is configured to derive the weights of the weighted sum from the smoothed trust indications.

16. The frame generator of claim 15 wherein at least some of the smoothed trust indications indicate that the values of at least some of the pixels of the first motion-compensated image are completely trusted, and wherein said plurality of pixels of the output frame comprises all of the pixels of the output frame except pixels which are indicated as being completely trusted by their corresponding smoothed trust indications.

17. The frame generator of claim 16 further wherein the smoothing module is configured to smooth only parts of the motion-compensated image which are not indicated as being completely trusted by the corresponding smoothed trust indications.

18. The frame generator of claim 11 wherein the combining module is further configured to use the trust indications to determine the position of an edge of an untrusted region of the first motion-compensated image, wherein the combining module is configured to selectively combine the first motion-compensated image and the smoothed motion-compensated image in accordance with the determined position of the edge of the untrusted region of the first motion-compensated image.

19. A computer program product configured to generate an output frame for inclusion in a video sequence which comprises a plurality of existing frames, the computer program product being embodied on a non-transitory computer-readable storage medium and including computer-executable instructions that cause a processor to perform the method of claim 1.

20. A system, comprising:
a processor; and
a computer-readable storage medium including modules that cause the processor to:
use at least one prediction based on at least one of the existing frames of the video sequence to generate a first motion-compensated image for representing the output frame;
determine trust indications for pixels of the first motion-compensated image, said trust indications indicating levels of trust in the values of said pixels of the first motion-compensated image;
spatially smooth at least part of the determined first motion-compensated image to determine a smoothed motion-compensated image; and
generate the output frame by using the determined trust indications for said pixels of the first motion-compensated image to selectively combine the first motion-compensated image and the smoothed motion-compensated image.

* * * * *